Figure 1:
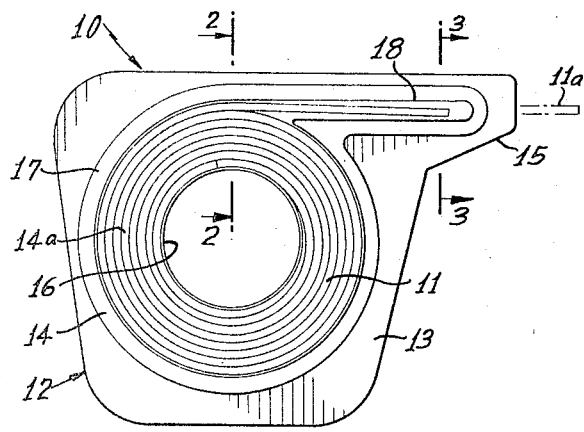

March 14, 1967  R. E. BARNABY, JR  3,308,938
SOLDER DISPENSER
Filed May 6, 1964

FIG. 5a     FIG. 5     FIG. 6     FIG. 6a

INVENTOR.
ROLAND E. BARNABY, JR.
BY
*James A. Eisenman*
ATTORNEY

United States Patent Office 3,308,938
Patented Mar. 14, 1967

3,308,938
SOLDER DISPENSER
Roland E. Barnaby, Jr., Garden City, N.Y., assignor to Rayline, Inc., Mineola, N.Y., a corporation of New York
Filed May 6, 1964, Ser. No. 365,265
13 Claims. (Cl. 206—56)

This invention relates to dispensing containers for solder in strip wire form.

Individual dispensing packages for solder have found increasing acceptance among consumers because they eliminate the need to handle bulk quantities and minimize contamination. In addition, some packaging techniques reduce hazards of burns and electrical shock.

Individual packaging can, however, be costly. Also, in the case of many designs for containers it is difficult to control the free or working end of the solder, which tends to retreat into the container, particularly when the solder supply is running out. Also, solder for present day uses comes in a variety of types such, for example, as resin core, acid core, and no core. In addition, low melting temperature alloys are available. It is important, however, that the right solder be used for the right job and conventional solder packaging does not necessarily lend itself to foolproof identification.

Accordingly, it is an object of the present invention to provide an improved dispenser for wire strip solder which overcomes the disadvantages of conventional dispensers and which protects the solder from contamination while affording full visibility of the solder supply.

Another object of the invention is to provide an individual dispensing package for wire strip solder which is convenient to use, particularly for precision work and which is at the same time inexpensive.

Still another object of the invention is to provide an improved solder dispenser which can be easily identified and located, even when relatively small quantities of solder are involved.

In accordance with the invention, a length of strip wire solder is deformed along its edge to define an out-of-round cross-sectional configuration. The edge-deformation can take the form of a longitudinal concave depression or of a series of transversely arranged depressions, and if desired the edge-deformation can be effected along two diametrically opposed lines. The length of strip wire solder, which is characteristically flexible and capable of supporting itself in any configuration or geometry into which it is formed, is wound onto a flat helix with the edge-deformation oriented to engage the next adjacent convolution of the helix.

The helix is mounted within a container comprised of a pair of flat, parallel sheets or surfaces embracing the flat sides of the helix, and one surface preferably formed of transparent material to expose the metallic helix to view. A suitable discharge conduit passes a free end of the helix from the dispenser, the conduit preferably taking the form of a channel bounded by the two sheets and extending tangentially from the outermost convolution of the helix. The dispensing assembly is rendered rigid by a hub within the helix joined to the two embracing sheets and by a circular edge wall surrounding the helix, radially speaking, and also joining the two sheets. If desired, the hub and edge wall can be formed integrally with the transparent sheet portion by deforming the sheet inwardly to form the hub and edge wall and securing two walls where they meet.

The discharge limb of the strip wire solder edge as drawn from the outer convolution of the helix is preferably brought out of the dispenser through a tab in one of the two sheets. By providing a relatively long discharge limb of solder captured within a discharge channel in the dispenser, retrograde motion of the solder back into the dispenser is discouraged as the supply is used up. In operation, by pulling out the discharge limb, an end of solder is exposed which can be conveniently brought to the work by manipulating the dispenser in pistol-grip fashion. The unused supply is shielded at all times from contamination and the possibility of the user being burned or shock is minimized by the fact that the dispenser rather than the exposed solder is held in the hand.

The operation of the unwinding helix, by virtue of the edge-deformation in the length of solder, is such that the helix rotates as one, as the solder is drawn off for use. The edge-deformation prevents sidewise slippage of one convolution over another and thus prevents bunching or binding of the solder mass within the dispenser. The edge-deformation also increases lengthwise friction between adjacent convolutions so that the entire series of convolutions tend to rotate as one, as the solder is drawn out of the dispenser.

Figure 2:
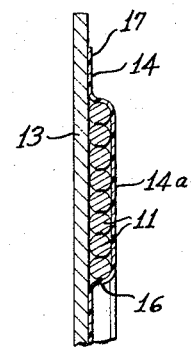
Figure 4:
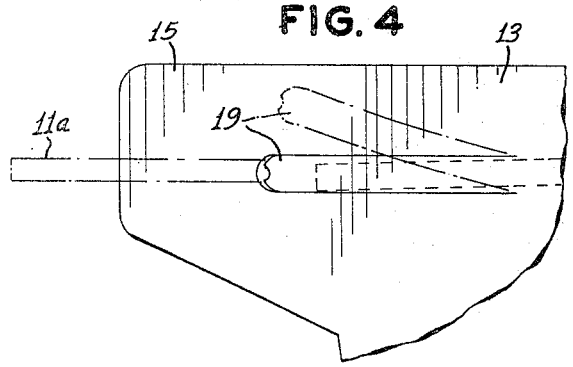
Figure 3:
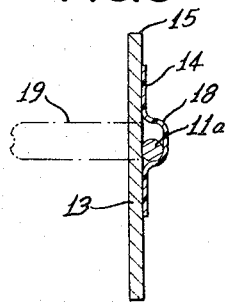
Figure 3:
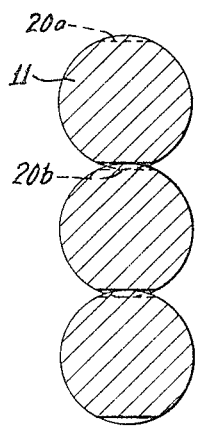
Figure 3:
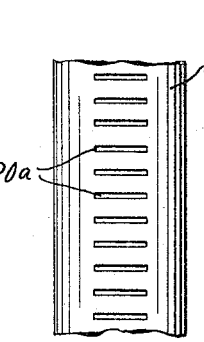
Figure 3:
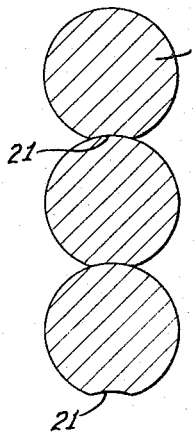
Figure 3:
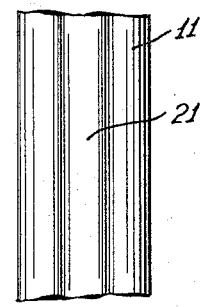

The above and other features and objects of the present invention will be apparent having reference to the accompanying drawing showing preferred embodiments thereof and in which:

FIGURE 1 is a side view of the solder dispenser;
FIGURE 2 is a view in vertical section taken on the line 2—2 of FIGURE 1, looking in the direction of the arrows;
FIGURE 3 is a view in transverse section taken on the line 3—3 of FIGURE 1, looking in the direction of the arrows;
FIGURE 4 is a fragmentary view of the reverse or back side of the dispenser in the vicinity of the line 3—3 of FIGURE 1, showing the opening tab through which the solder is withdrawn.
FIGURE 5 is a view in cross section in enlarged scale showing a series of contiguous convolutions of the solder helix in transverse section, such as seen along the line 2—2 of FIGURE 1, for example, and illustrating edge-deformation of the solder;
FIGURE 5a is a side view, also in enlarged scale, showing a short length of solder having an edge-deformation of the type illustrated in FIGURE 5;
FIGURE 6 is a view, also in enlarged scale and similar to the view of FIGURE 5, showing in cross section a modified edge-deformation of the strip wire solder; and
FIGURE 6a is a side view in enlarged scale of a short length of the solder of FIGURE 6 illustrating the edge-deformation.

Referring to the drawing, there is illustrated in FIGURE 1 and identified generally by the numeral 10 a solder dispenser formed in accordance with the present invention and including a helix of solder 11, the structural details of which are described below, and a dispensing container 12, preferably formed of a pair of flat surfaces or sheets 13 and 14, best seen in FIGURE 2. The container 12 has as one preferred shape a pistol-grip configuration for convenient manipulation in the hand of the user. The working limb of solder 11a is drawn through and extends outward from an elongated projection 15 formed integrally with the dispensing container 12.

In the illustrated embodiment the sheet 13 takes the form of a paperboard or other semi-rigid sheet of electrical and heat insulating material. The sheet 13 forms the base of the dispensing container and the sheet 14 the upper surface. The sheet 14 is superimposed on the sheet 13 to provide a flat, annular surface 14a overlying the solder helix 11. The sheet 14 is preferably formed of sheet-plastic or a like transparent material to expose the solder helix to view.

The solder helix 11 includes a relatively large center opening within which is disposed a circular hub portion 16 and the outermost convolution of the solder helix is surrounded by a circular edge wall 17. Preferably, the hub 16 and circular wall 17 are formed integrally with one of the flat sheet members. In the illustrated embodiment, the hub and wall are formed by deforming the transparent sheet 14 inwardly. The two sheets 13 and 14 are securely joined within the hub 16 and outwardly of the edge 17. In this fashion beam strength is imparted to the combined assembly. If desired, the transparent sheet 14 can extend outward to the edges of the sheet 13 to afford enlarged overlapping surfaces.

As best seen in FIGURE 3, the upper transparent sheet 14, in the vicinity of the elongated extension 15 is formed with a solder conduit 18 through which the discharge limb 11a of solder passes. In its initial or unused state, the solder limb 11a is sealed within the conduit 18 and to facilitate extraction thereof a pre-scored tab 19 is formed in the lower sheet 13 in alignment with the conduit. To extract the free end of the solder the tab 19 is lifted to expose the limb of solder which is then pulled out as needed. It will be observed that the relatively long limb of solder from the helix to the discharge point is closely confined by the conduit. In this fashion there is established a relatively long, straight limb of solder which cannot fall back into the container by virtue of its own weight. To return unused solder to the container it is necessary to force the limb inward under a measurable pressure, causing the helix to turn to wind the replaced solder on itself. The position of the helix in winding or unwinding motion is based on the edge-deformation characteristics best illustrated in FIGURES 5 and 6.

Referring first to FIGURES 5 and 5a, the solder 11 is edge-deformed along lines or strips 20a and 20b, which cause the circular cross section wire to assume an out-of-round configuration. In the arrangement of FIGURES 5 and 5a this edge-deformation takes the form of an aligned series of transverse indentations and the solder is wound on the helix with the edge-deformations oriented to engage the contiguous convolutions, i.e. the solder is wound with the edge-deformations spaced radially with respect to the radius of the helix. The stacked convolutions in the helix thus engage one another with augmented stability and frictional coupling so that as the discharge limb 11a is pulled the entire helix is set into rotary motion. The helix similarly rotates in the reverse direction when the discharge limb is forcefully pressed back into the container.

Referring to FIGURE 6, an alternative edge-deformation is illustrated in which a single line of edge-deformation 21 in the form of a slightly concave depression (as viewed in cross section) extending lengthwise of the solder strip. In this arrangement successive convex surfaces of the adjacent convolutions nest within concave edge-depressions and the array of convolutions is stabilized so that the entire helix tends to rotate. In the absence of edge-deformation unstable equilibrium obtains and the tendency is for the helical pile to collapse under the tension imported to the system when solder is pulled from the dispenser.

While the invention has been described having reference to preferred embodiments thereof, it will be understood that it can take various forms and arrangements without departing from the scope of the invention. Thus, for example, separate hub pieces and circular edge pieces or spacers can be used in lieu of the integral hub 16 and circular edge 17, to define the toroidal chamber for the solder helix. Alternatively a helical depression can be formed in the base sheet 13, together with the tangential discharge conduit. Also, it is possible under certain circumstances to extract solder from the inner convolution of the helix through a suitable conduit.

In all cases it is preferred, as shown in the illustrated embodiments of the invention that the entire solder mass be sealed within a dust-tight housing with the only opening occurring at the point of discharge of the solder from the container.

The invention should not, therefore, be regarded as limited except as defined by the following claims.

I claim:

1. Flexible wire strip solder dispensing means, comprising, a length of flexible wire strip solder edge-deformed along its length to define an out-of-round cross sectional configuration, said length being wound in a flat helix with the line of edge deformation being oriented to engage adjacent convolutions, and a container for the solder helix, including a pair of laterally spaced apart surfaces embracing the helix and means defining a discharge opening through which a free end of the length of wire strip solder passes.

2. Dispensing means as set forth in claim 1, including a hub portion disposed within the helix and a circular edge portion surrounding the helix, said hub and edge portion defining a toroidal space for the solder helix.

3. Dispensing means as set forth in claim 2, said discharge means including an elongated tubular portion extending tangentially from the edge portion through which a free end of the solder helix passes.

4. Dispensing means as set forth in claim 3, including a removable tab portion formed in the flat support piece beneath the elongated tubular portion through which the free end of the solder is passed from the elongated portion in a relatively straight limb.

5. Flexible wire strip solder dispensing means, comprising, a length of flexible wire strip solder edge-deformed along its length to define an out-of-round cross sectional configuration, said length being wound in a flat helix with the line of edge deformation being oriented to engage adjacent convolutions, and a support for the solder helix, including, a pair of laterally spaced apart surfaces embracing the flat surfaces of the helix, a circular hub within the helix, a circular edge surrounding the helix, and means defining a solder discharge conduit extending tangentially from the circular edge and through which the outer convolution of wire strip solder is drawn tangentially from the helix.

6. Dispensing means as set forth in claim 5, said length of strip solder being edge-deformed along two diametrically opposed lines and wound with the two edge-deformations oriented radially with respect to the helix, whereby one deformed edge engages the other in the helical configuration.

7. Dispensing means as set forth in claim 5, said hub and circular edge being joined to both of laterally spaced apart surfaces.

8. Dispensing means as set forth in claim 7, one of said flat surfaces comprising a flat base sheet and the other a flat transparent sheet, the latter being deformed inward adjacent the outer convolution of the helix to define the circular edge and deformed inward within the helix to define the hub, said sheets being joined at the hub and beyond the circular edge to form a rigid structure.

9. Dispensing means as set forth in claim 5, said laterally spaced apart surfaces including an extension generally tangential to the outer convolution of said helix to define said discharge means.

10. Dispensing means as set forth in claim 9, including a movable tab forward in the extension of one of said surfaces through which a free end of the solder is dispensed.

11. Dispensing means as set forth in claim 5, said edge-deformation in the length of wire strip solder comprising a concave depression extending lengthwise thereof.

12. Dispensing means as set forth in claim 5, said edge-deformation in the length of wire strip solder comprising a series of embossed score lines having component directions transverse with respect to the axis of the length of wire solder.

13. Flexible wire strip solder dispensing means comprising, a flat helix of wire strip solder in the form of a plurality of convolutions wound in a single thickness and having a tangential limb extending from the outer convolution, and a container for the helix comprising a generally flat support piece underlying the helix and having a lateral extension underlying the tangential limb of the solder, a central circular hub disposed within the helix to form a fixed core about which the entire helix rotates when the dispenser is operated, a transparent flat cover piece attached to the support piece and overlying the solder helix and spaced therefrom by substantially the thickness of the wire strip, means defining a fixed conduit for the tangential limb having an opening adjacent its end remote from the helix, the conduit being slightly larger in cross-section than the solder to prevent the tangential limb of solder from bending when the solder is axially compressed against a work piece, whereby the straight limb in conjunction with the curvilinear convolutions of the helix acts to restrict re-entrant motion of the solder into the opening and whereby the curved solder of the helix is urged into a straight configuration tangential to the helix as solder is drawn from the opening, said central hub maintaining the helix centered within the dispenser as successive convolutions are dispensed.

References Cited by the Examiner
UNITED STATES PATENTS

| | | | |
|---|---|---|---|
| 1,493,381 | 5/1924 | Phelps | 206—59 |
| 2,514,542 | 7/1950 | Guest | 206—56 |
| 2,615,565 | 10/1952 | Bower et al. | 206—63.3 |
| 3,063,557 | 11/1962 | Scholl | 206—78 |
| 3,127,012 | 3/1964 | Smoot | 206—56 |
| 3,253,705 | 5/1966 | Stoker | 206—80 |

FOREIGN PATENTS 188,948  11/1922  Great Britain.

THERON E. CONDON, *Primary Examiner.*

W. T. DIXSON, JR., *Assistant Examiner.*